United States Patent
Balasubramanian et al.

(10) Patent No.: US 7,379,738 B2
(45) Date of Patent: May 27, 2008

(54) INFORMATION SERVICE BROADCAST CONTROL IN A WIRELESS COMMUNICATION NETWORK

(75) Inventors: Srinivasan Balasubramanian, San Diego, CA (US); Aleksandar Damnjanovic, San Diego, CA (US); Anthony C. K. Soong, Superior, CO (US)

(73) Assignee: Telefonaktiebolaget LM Ericsson (publ) (SE)

( * ) Notice: Subject to any disclaimer, the term of this patent is extended or adjusted under 35 U.S.C. 154(b) by 498 days.

(21) Appl. No.: 10/314,860

(22) Filed: Dec. 9, 2002

(65) Prior Publication Data

US 2004/0203773 A1    Oct. 14, 2004

Related U.S. Application Data

(60) Provisional application No. 60/409,510, filed on Sep. 10, 2002, provisional application No. 60/401,135, filed on Aug. 5, 2002.

(51) Int. Cl.
*H04Q 7/20* (2006.01)
*H04Q 7/38* (2006.01)

(52) U.S. Cl. ............... 455/435.1; 455/414.1; 455/414.3; 455/435.1; 455/446; 455/422.1

(58) Field of Classification Search .......... 455/422, 455/414.1, 414.3, 422.1, 435.1, 446
See application file for complete search history.

(56) References Cited

U.S. PATENT DOCUMENTS

| | | | | |
|---|---|---|---|---|
| 4,876,738 A | * | 10/1989 | Selby | ............ 455/435.1 |
| 5,097,499 A | * | 3/1992 | Cosentino | ............ 455/435.1 |
| 5,212,822 A | * | 5/1993 | Fukumine et al. | ........ 455/435.3 |
| 5,406,614 A | * | 4/1995 | Hara | ............ 455/435.3 |
| 5,642,398 A | | 6/1997 | Tiedemann, Jr. et al. | |
| 5,732,350 A | * | 3/1998 | Marko et al. | ............ 455/435.1 |
| 6,721,755 B1 | * | 4/2004 | Lee | ............ 455/435.1 |
| 2002/0142788 A1 | * | 10/2002 | Chawla et al. | ............ 455/504 |

(Continued)

FOREIGN PATENT DOCUMENTS

EP           1185125         3/2002

(Continued)

OTHER PUBLICATIONS cdma2000 Broadcast Services State 2: System Design, Rev. 2; Tao Chen; Daegyun Kim, Yong Sun Cho; Jun. 10, 2002; 75 pgs.

*Primary Examiner*—Vincent P. Harper
*Assistant Examiner*—Marisol Figueroa
(74) *Attorney, Agent, or Firm*—Coats & Bennett, P.L.L.C.

(57) ABSTRACT

A wireless communication network limits the service areas within the network by transmitting time registration flag information in each of a plurality of network service areas. The flag information indicates whether registration for a given broadcast service currently is required for mobile stations in the service area that desire access to the broadcast service. Thus, the transmitted flag information may be used to prompt for such registrations and detecting whether any registrations are timely received in response to such prompting permits the network to timely deactivate one or more broadcast services. Each service area controls one or more service zones, each of which may include multiple member service areas and, preferably, the network activates a requested broadcast service per service zone and deactivates that service per service area. The timing of such deactivations may be made compatible with mobile stations that do not recognize transmitted registration flag information.

52 Claims, 6 Drawing Sheets

U.S. PATENT DOCUMENTS

| | | | |
|---|---|---|---|
| 2003/0078042 A1* | 4/2003 | Miriyala et al. | 455/435 |
| 2003/0114177 A1* | 6/2003 | Sinnarajah et al. | 455/515 |
| 2003/0148765 A1* | 8/2003 | Ma et al. | 455/438 |
| 2003/0157966 A1* | 8/2003 | Sato et al. | 455/561 |
| 2003/0228861 A1* | 12/2003 | Leung et al. | 455/412.1 |
| 2005/0227731 A1* | 10/2005 | Kall | 455/414.1 |

FOREIGN PATENT DOCUMENTS

| | | |
|---|---|---|
| WO | WO 9952304 | 10/1999 |

* cited by examiner

INFORMATION SERVICE BROADCAST CONTROL IN A WIRELESS COMMUNICATION NETWORK

RELATED APPLICATIONS

The instant application claims priority under 35 U.S.C. § 119 from the provisional application filed on Aug. 5, 2002 and assigned Ser. No. 60/401,135, and from the provisional application filed on Sep. 10, 2002 and assigned Ser. No. 60/409,510, both of which are expressly incorporated herein by reference.

BACKGROUND OF THE INVENTION

The present invention generally relates to information services provided on a broadcast basis within a wireless communication network, such as a cellular communication network, and particularly relates to controlling the number of service cells used to support such services for one or more mobile stations.

One of the most striking points regarding the evolution of Public Land Mobile Networks (PLMNs), such as cellular voice and data networks, is the increasing variety and sophistication of the available services. One of the newer services associated with the expanding data capabilities of current and planned wireless networks is broadcast/multicast service. With that service type, an information stream, such as a streaming news report, is "broadcast" on a commonly available channel within one or more cells of the network such that a plurality of mobile stations may simultaneously receive the information stream by "tuning" to the broadcast/multicast channel.

Because the intent of such services is to provide essentially "blanket" coverage at least within a defined service area, such broadcast channels are resource intensive in terms of the transmit power allocated to them. In this sense, a broadcast channel signal is similar to a paging channel signal in that it is transmitted with a relatively high transmit power to ensure adequate reception throughout the coverage area of a given radio base station. However, the data rate of the average broadcast channel signal is much higher than that of the average paging channel, e.g., 64 Kbps versus 4.8 Kbps, so the transmit power required to achieve similar coverage for the broadcast channel is potentially much higher than that used for standard paging channels.

Several practical considerations thus arise when providing such broadcast channels within a cellular communication network. First, because such channels are so resource intensive, the capacity of the network is unduly compromised and resources that might otherwise be used to support other services for other users are wasted unless the region(s) in which a given broadcast channel is activated is reasonably restricted to the areas in which mobile stations are actually tuned to the broadcast channel. That is, the number of network transmitters used to transmit the broadcast channel signal would ideally be restricted to just the cell or cells where the mobile stations tuned to the service are located.

However, the idealized service area restrictions may not yield acceptable service from the perspective of mobile station users interested in receiving the broadcast service. For example, assume that a mobile station within a network service cell registers for an information stream, and the network activates a broadcast channel signal for that stream in response. If the broadcast channel signal is transmitted only within the mobile station's current cell, then service disruptions will result if the mobile station moves out of the current cell's coverage area into the coverage area(s) of one or more neighboring cells.

Thus, to minimize such disruptions, the network operator may activate the service not only in the current cell but also within a range of neighboring cells. Establishing the range of neighboring cells that are activated is, however, a key challenge in balancing the desire to avoid (or at least minimize) service interruptions for a moving mobile station with the desire to efficiently use network resources. In current approaches, the range of neighboring cells in which the service is activated includes those within a geographic range that is set according to a periodic service registration timer in the mobile stations. Using a shorter periodic registration timer enables the use of smaller geographic ranges but increase the signaling overhead in the network.

SUMMARY OF THE INVENTION

The present invention comprises a method and apparatus to determine a geographic range over which a wireless communication network activates a broadcast service for one or more mobile stations desiring that service by using transmitted registration flag information. Registration flag information is transmitted by the network in each service area, which may comprise, for example, a radio "cell" or "sector." The flag information indicates whether registration for a given broadcast service currently is required within the service area, and permits the network to prompt for such registrations and timely detect when there are no mobile stations within the service area that desire access to the broadcast service. One or many broadcast services may be individually controlled in such manner by the network and, preferably, registration flag information is transmitted for each available broadcast service.

In an exemplary embodiment, the network defines one or more "service zones," with each zone comprising one or more member service areas, wherein at least one such member service area is defined as a "controlling" service area. Thus, in an exemplary implementation, each service area functions as a controlling service area for at least one service zone but may be an associated member of one or more other service zones. The network activates (or continues) transmission of a requested broadcast service for an entire service zone responsive to receiving a registration request for that service from a mobile station operating within the service area that controls that zone.

In more detail, if a registration request for a given broadcast service is received from a mobile station within a given service area, the network activates (or continues) the requested broadcast service in each of the service areas that are members of the service zone controlled by the given service area. Further, the network temporarily clears the registration flag information for the requested broadcast service in the given service area responsive to receiving the request. After a first timeout period, the network resets the flag information, which prompts any mobile stations in the given service area that desire the broadcast service to again register for the service. If no such registrations are received within a second timeout period of resetting the flag information, the network considers the broadcast service to have expired for the service zone controlled by the given service area. If such a request is received, the network again repeats the time registration flag information clearing and resetting according to the first and second timeouts as described above.

With such an approach, broadcast services are activated (or continued) on a service zone basis and deactivated on a service area basis. That is, the network activates or continues transmitting a given broadcast service for an entire zone responsive to receiving a registration request for that service in the service area controlling that zone. However, because a given service area may be a member of multiple service zones, the broadcast service is deactivated in that service area only if the service has expired in all service zones in which it is a member.

Of course, it should be noted that the relationship between service areas and service zones, and the details regarding the definition of controlling service areas may be varied as needed or desired. Regardless, the transmission of timed registration flag information in each service area avoids the need for all mobile stations that desire activation or continuation of a broadcast service within a given service area to periodically transmit registration requests for that service. With the flag-based approach, the network sets the corresponding flag in that service area, and then temporarily clears it responsive to receiving a registration request for that service, which largely prevents appropriately configured mobile stations from sending further registration requests for the same service.

Even with usage of the registration flags, the network remains compatible with mobile stations that use more conventional periodic registration methods. For example, the timeout periods used to time service expiration may be set to accommodate periodic registration delays and thus avoid premature service expiration. However, the use of mobile stations that do recognize such registration flag information yields greater network capacity utilization efficiency through reduced registration signaling.

Further efficiency gains arise where such mobile stations are configured to avoid the possibility for mass registrations within a given service area. Thus, in an exemplary embodiment, such mobile stations are configured to wait before sending a registration request in response to recognizing a set registration flag. The length of time each mobile station waits may be made to vary among mobile stations by basing the delay on a hashing function that uses, for example, the mobile station's unique International Mobile Station Identity (IMSI).

Regardless of such mobile station details, an exemplary network supporting the present invention includes one or more base station controllers, with each base station controller associated with one or more radio base stations. Preferably, each radio base station provides broadcast service coverage for one or more service areas and the registration flags transmitted by that radio base station are controlled by its associated base station controller. In this role, the base station controller times the setting and clearing of the flag information transmitted within the service areas managed by it in response to receiving registration requests for the broadcast service(s) from mobile stations operating in those service areas. For example, the base station controller typically maintains timer pairs for each broadcast service in each zone for timing the first and second timeout periods used to control clearing and resetting the registration flag for each such broadcast service within each area. Of course, those skilled in the art will appreciate that other flag control arrangements may be used.

In other exemplary variations of the present invention, the service zone definitions used for broadcast service control may be defined as fixed associations between service areas and service areas based on, for example, the physical layout of service areas over the geographic region covered by the network and/or the radio coverage characteristics among such areas. However, the service zone definitions may be dynamically formed based on, for example, active set reports from mobile stations desiring access to a given broadcast service. Using such active set reports in combination with known neighbor lists for each of the service areas, the network can dynamically form service zones for serving particular mobile stations or groups of mobile stations.

In any case, the present invention generally comprises the transmission of registration flag information in each of a number of service areas comprising the network's radio coverage area. Such flag information is used to limit the number of service areas over which a given broadcast service is activated and to timely deactivate such services, while still ensuring minimal service interruptions. Exemplary implementations of the present invention will be better understood based on the following detailed description and the accompanying figures.

DETAILED DESCRIPTION OF THE INVENTION

With the advent of packet data communications and Internet connectivity, contemporary wireless networks have the opportunity to provide users with streaming content, or other types of broadcast information services to users. Such services, including broadcast and Internet "multicast" services, are broadly referred to herein as "broadcast services." Because the transmission of such services is resource intensive, particularly so in terms of transmit power, the region over which a given broadcast service is transmitted should be constrained as much as possible. The present invention uses a service area/zone concept in combination with network-transmitted broadcast service registration flags to control broadcast service transmissions by the network. In general terms, broadcast services are activated on a zone basis and deactivated on an area basis using broadcast registration flags and associated timers.

Figure 1:
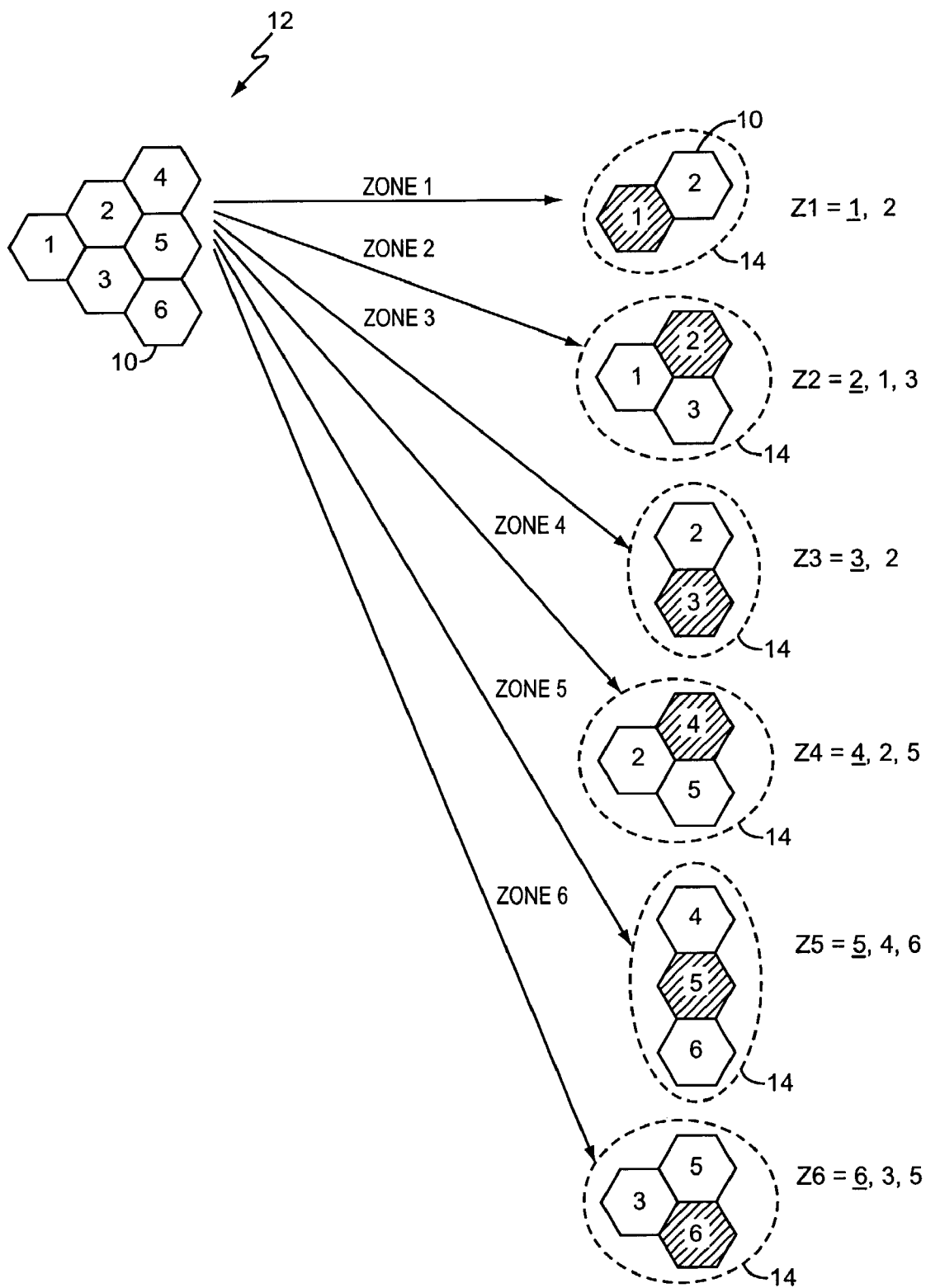
FIG. 1 is a diagram of an exemplary arrangement of service areas and corresponding service zones.

FIG. 1 illustrates an exemplary approach to such broadcast service control. A wireless network 12 provides radio service over a number of service areas 10. As noted, the term "service area" may connote network cells, sectors, or some other defined area of radio coverage within network 12 and, as such, the term should be given broad construction herein.

In any case, according to this exemplary embodiment of the present invention, one or more service zones 14 are defined, with each service zone 14 including one or more member service areas 10, and wherein at least one such member service area 10 functions as a "controlling" service area 10 for the service zone 14. Thus, a given service zone 10 may be a controlling member of one or more service zones 14, and additionally may be a non-controlling (associated) member of one or more other service zones 14.

In the illustrated example, there are six service areas 10, i.e., Areas 1 . . . 6, and six service zones 14, i.e., Zones 1 . . . 6, but it should be noted that such one-to-one correspondence between areas and zones is not required. Area 1 controls Zone 1, Area 2 controls Zone 2, and so on. Note that each zone 14 includes one or more associated member service areas 10 in addition to the controlling service area 10. For example, Zone 2 is controlled by Area 2, but it also includes as members Areas 1 and 3. The controlling service area 10 within each zone 14 is "shaded" in the illustration. Thus, Area 1 is shaded in the depiction of Zone 1, Area 2 is shaded in the depiction of Zone 2, and so on. However, it should be noted that the illustrated relationship is an exemplary one, and the present invention may be practiced with other arrangements, such as multiple controlling service areas 10 for a given zone 14.

Assuming that a given broadcast service is currently inactive within a given service area 10, the network 12 "sets" the registration flag transmitted by the network 12 within that given service area 10 to indicate to mobile stations that registration for the broadcast service is required. If such a request is received from a mobile station within a given service area 10, network 12 activates the requested service for the entire zone 14 controlled by such given service area 10 (the controlling service area 10) and temporarily clears the registration flag information corresponding to the requested broadcast service for that controlling service area 10. After a first timeout period, the network resets the flag for the controlling service area 10 to indicate that registration is again required.

If no subsequent registration request is received within a second timeout period, the network 12 considers the service to have expired for the service zone 14 controlled by that area 10 and the service is deactivated for that service zone 14. However, as will be explained in more detail later herein, deactivation of the broadcast service for a given zone 14 does not mean that the service is inactivated for all service areas 10 within that zone 14, since such service areas 10 may belong to other service zones 14 in which the same broadcast service is still active.

As a concrete example based on the illustration, assume that a given broadcast service currently is inactive within Zones 1, 2 and 3. Thus, the registration flag for that service is set for Areas 1, 2 and 3. Further, assume that a mobile station operating within Area 2 then transmits a registration request for the service. Assuming that resources are available to support the request, the network 12 activates the service for all of Zone 2, since Area 2 is designated as the controlling service area only for that zone. Such activation results in the broadcast service being activated in Areas 1 and 3 in addition to Area 2, since such areas are associated members of Zone 2.

In concert with activating the service for Zone 2, the network 12 clears the registration flag for the service in Area 2 (but not in Areas 1 and 3), since Area 2 was the area 10 from which the request was received. After a first timeout, the network 12 resets the flag for Area 2 and begins a second timeout. If no registration request is received within that second timeout, the network 12 deems the service to have expired for Zone 2. However, such expiration alone does not necessarily cause the actual deactivation of the broadcast service in the areas 10 comprising Zone 2 because other registration requests might have been received in Area 1 or 3. Thus, transmission of a broadcast service within a given area 10 is terminated only when that service has expired in all zones 14 with which that area 10 is associated.

Continuing the above example, one sees that temporarily clearing the registration flag in Area 2 while leaving those flags set in Areas 1 and 3 ensures that mobile stations desiring access to the broadcast service are prompted to re-register as they move from Area 2 into Area 1 or 3. In this manner, the "active zone" for the broadcast service "follows" a mobile station as it moves through the various zones 14 of the network 12.

Such operation ensures that when a mobile station performs, for example, an idle handoff to a new cell while monitoring a given broadcast service, that service will be available in the new cell without requiring activation over a large region. Thus, the present invention avoids the forward link inefficiencies that arise from transmitting the broadcast service in an overly large geographic region while avoiding the sort of service interruptions that might otherwise occur if the registration flag was cleared for all service areas 10 within a zone 14. Further, by temporarily clearing the flag within the service area 10 that receives a registration request, the network 12 ensures that it has a mechanism for timely deactivating broadcast services once such services are activated. As explained later, all such operations may be made compatible with mobile stations that use periodic registrations rather than flag-based registrations.

Figure 2:
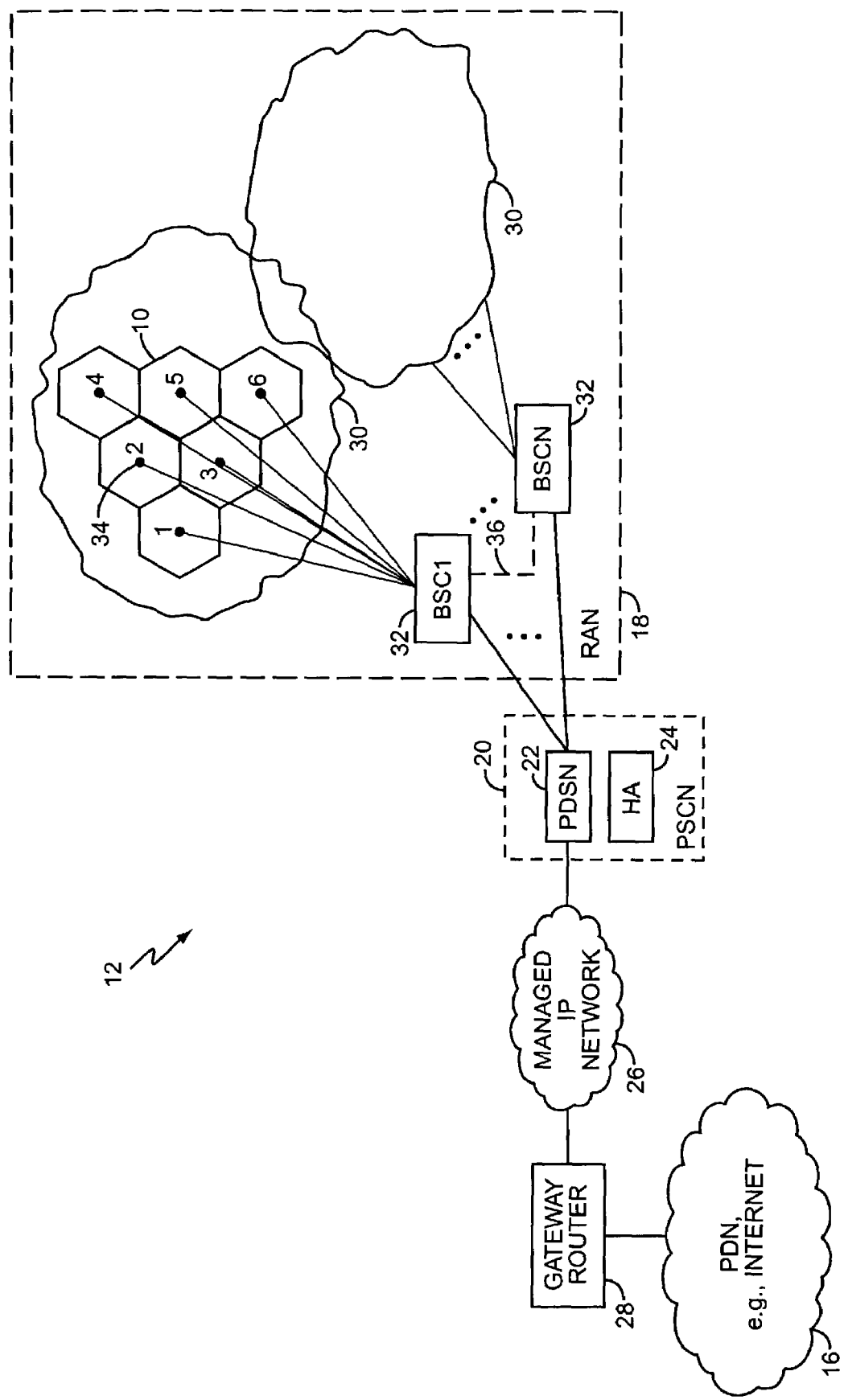
FIG. 2 is a diagram of an exemplary wireless communication network including the service areas and service zones of FIG. 1.

In turning to network details, FIG. 2 illustrates details for the exemplary wireless communication network 12, including the previously illustrated areas 10 and zones 14. Network 12 manages broadcast services in accordance with the present invention, and may be implemented, for example, in accordance with cdma2000 standards. However, those skilled in the art will appreciate that network 12 may be implemented according to a wide range of other network standards, including IS-95, IS-856 (HDR), WCDMA, GSM/GPRS, and that other network implementations might use different architectures and different nomenclature for the various network entities.

Network 12 communicatively couples a plurality of mobile stations (not shown) to various external networks, such as Public Data Networks (PDNs) 16, e.g., the Internet. A Radio Access Network (RAN) 18 provides the interface between the mobile stations and a Packet Switched Core Network (PSCN) 20, which, in an exemplary embodiment, includes a Packet Data Serving Node (PDSN) 22 and a Home Agent (HA) 24. The PSCN 20 typically is coupled to PDN 16 through a managed IP network 26 and a gateway router 28.

In this exemplary embodiment, RAN 18 provides coverage over one or more sets 30 of service areas 10, and includes one or more Base Station Controllers (BSCs) 32, e.g., BSC1 . . . BSCN. Each BSC 32 controls a potentially large number of Radio Base Stations (RBSs) 34. Nominally, each RBS 34 provides broadcast service and registration flag transmission within a given one of the service areas 10. Thus, with this exemplary arrangement, each BSC 32 manages a plurality of service areas 10 and service zones 14 corresponding to the RBSs 34 it manages. Of course, the sets 30 of service areas 10 may overlap, and thus service zones 14 may span BSCs 32. In such circumstances, inter-BSC communication related to broadcast service management, e.g., notification of received registration requests, may be carried over one or more inter-BSC links 36. Those skilled in the art will recognize that the illustrated details depend upon specific BSC/RBS details and that the present invention is not limited to a one-to-one correspondence between RBSs 34 and service areas 10.

Regardless, the network 12 manages broadcast services in accordance with the methods introduced in the discussion of FIG. 1. Thus, continuing the area/zone definitions example of FIG. 1 for FIG. 2, BSC 1 controls RBSs 1 . . . 6 for Areas 1 . . . 6 and thus is responsible for managing broadcast services in the corresponding Zones 1 . . . 6. In operation, BSC1 sets and clears the registration flags transmitted from each of the RBSs 34 providing radio service to Areas 1 . . . 6, and manages activation and deactivation of the requested broadcast services within Zones 1 . . . 6 accordingly.

In general, each service zone 14 is defined as a set of contiguous or at least neighboring service areas 10. For example, where the service areas 10 equate to radio cells within the network's overall coverage area, each service zone 14 might be defined based on the overlapping radio coverage of the cells. Network planning information may be used to inform such area/zone definitions, and such information may include the "neighbor list" and/or "active set" data describing the sets of RBSs 34 typically "seen" by mobile stations at various points within the network's coverage area. In other embodiments, the use of dynamically defined zones 14 may supplement or replace such preconfigured zone definitions.

As noted, network 12 exploits the area/zone definitions to limit the activation regions for individual broadcast services transmitted by network 12, while avoiding or substantially reducing service interruptions for mobile stations that move among different service areas/zones while subscribed to a broadcast service. To this end, network 12 uses the transmitted registration flags in each service area 10 to control registrations of mobile stations desiring activation (or continuation) of a given broadcast service. In an exemplary embodiment, the overall scheme broadly includes several points:

- the network 12 transmits registration request flags on one or more "overhead" channel signals to control broadcast service registrations by mobile stations desiring the activation (or continuation) of one or more broadcast services;
- the flag information is controlled independently in each service area 10, and each service area 10 transmits registration flag information for each broadcast service available in that service area 10;
- the flag information may be transmitted with relatively little data overhead by configuring each flag as a "1-bit" logical indicator that is "set" to indicate registration is required and "cleared" to indicate that such registration is not required; and
- the network 12 activates broadcast services on a per service zone basis.

Thus, an exemplary implementation of the implementation mechanism only requires the addition of a one-bit flag to the overhead information, such as a Broadcast Service Parameters Message (BSPM) that is broadcast in a given service area 10 on a common channel, such as F-PCH or F-BCCH. Used as such, the flag indicates whether a registration for a particular broadcast information service is required to either initiate or "keep-alive" that information service in the zone 14 controlled by the given service area 10.

Figure 3:
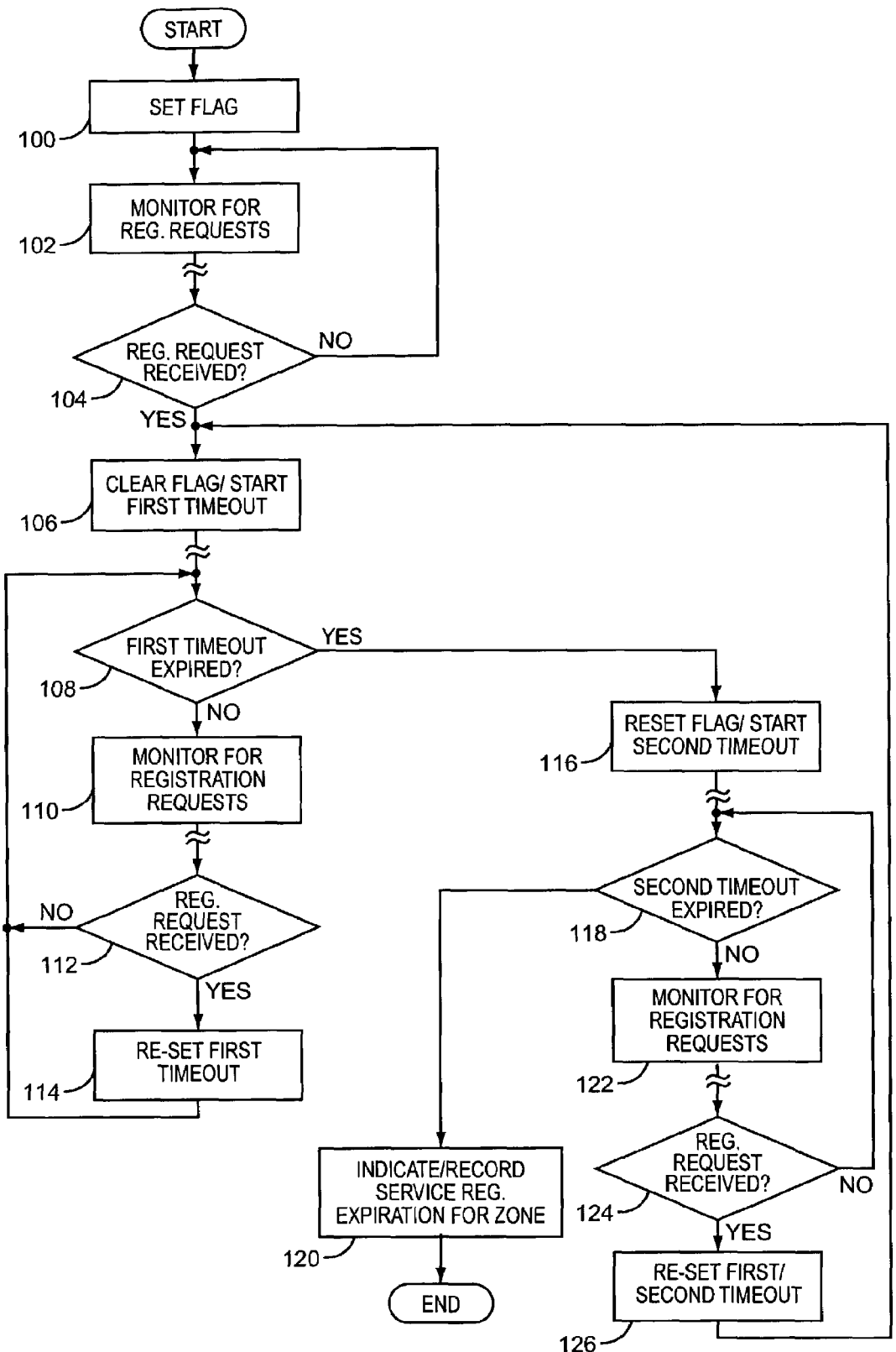
FIG. 3 is a diagram of exemplary flag management logic for a service area.

FIG. 3 illustrates exemplary service zone flag management that may be used by network 12 for each available broadcast service, thus the illustrated logic applies to managing flag information for a given broadcast service within the controlling service area(s) 10 for a given service zone 14. If additional broadcast services are available, similar logic will be used to manage the additional flags corresponding to those additional services.

Processing begins with the assumption that the broadcast service is inactive for the zone 14. Thus, the relevant registration flag is "set" to indicate that any mobile station within the controlling service area 10 desiring access to the broadcast service must transmit a service registration request to activate the broadcast service (Step 100). The network 12 monitors for receipt of any request from such service area 10 (Step 102). Monitoring continues until a registration request is received (Step 104), at which point the network 12 activates the requested service for the entire zone 14, clears the flag information and starts a first timer (T1), i.e., begins timing a first timeout period (Step 106). A "clear" flag indicates that registration for the broadcast service is not required.

If the first timeout period has not expired (Step 108), the network 12 monitors for receipt of subsequent registration requests for the broadcast service from any mobile station within the service area 10 (Step 110). If such a request is received before expiration of the first timeout period (Step 112), the first timer is re-started, thereby preventing expiration of the first timeout period. Note that each subsequent request restarts the first timeout period.

If no such subsequent requests are timely received within the service area 10 and the first timeout period expires (Step 108), the network 12 resets the flag to indicate that registration for the broadcast service is again required within the service area 10 and starts a second timer (T2), i.e., begins timing a second timeout period (Step 116). If that second timeout period expires before another registration request is received within the service area 10 (Step 118), the network considers the broadcast service to have expired for the service zone 14 (Step 120). If the second timeout period has not expired, the network 12 continues monitoring for the receipt of service requests within the service area 10 (Steps 122 and 124). Upon receipt of such a service request, the network 12 resets the first and second timers (Step 126), again clears the flag and begins timing the first timeout period (Steps 106, and on).

Because a given service area 10 may be a member of multiple zones, the network 12 generally does not deactivate a given broadcast service within that service area 10 unless the broadcast service has expired in all zones 14 in which the service area 10 is a member. Thus, in an exemplary approach, the network 12 includes processing and control logic in the form of hardware, software, or some combination thereof, that activates a given broadcast service within a service area 10 when any zone 14 with which that area 10 is associated becomes active, and deactivates service in that area 10 only when all such associated zones 14 become inactive.

Thus, according to the above logic, the network 12 sets and clears the registration flag for each available broadcast service in each defined service area 10 responsive to receiving (or not receiving) registration requests within each service area 10. The upshot of the control method is that, for a given broadcast service, the network 12 sets the corresponding registration flag to indicate that registration for the service is required and temporarily clears that flag in response to receiving a registration request for the broadcast service from a mobile station operating in the service area 10. If no subsequent requests are received with the first timeout period, the network 12 resets the flag, which prompts any mobile stations in the area 10 to again register for the service. If no such requests are received within a second timeout period of resetting the flag, the network 12 presumes there are no longer any mobile stations within the service area 10 that desire access to the broadcast service, and thus sets a service expiration indicator (Step 120).

Figure 4:
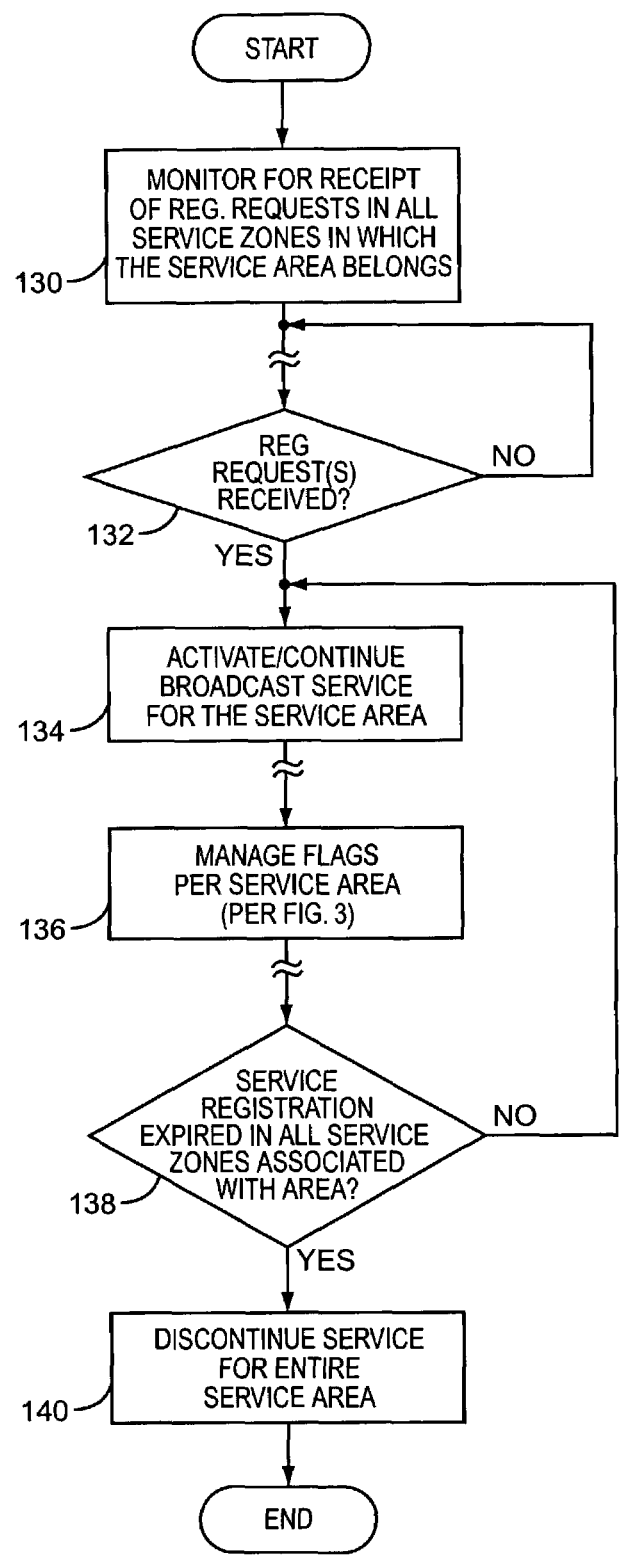
FIG. 4 is a diagram of exemplary broadcast service control logic for a service zone.

FIG. 4 is based on this exemplary flag/timer control logic but presents a higher layer of control logic with which the network 12 manages the transmissions of broadcast services on a service zone basis. It should be understood that in one or more exemplary embodiments the network 12 implements the illustrated logic for each available broadcast service in each defined service zone 14.

In simple terms, an exemplary implementation of the present invention activates a given broadcast service within a given service area 10 if a registration request is received for that service in any service zone 14 in which that service area 10 is a member. Conversely, a given broadcast service is discontinued within a given service area only if that service has expired in all service zones 14 in which that service area 10 is a member. Thus, an "OR" logical construct of all associated service zones 14 is associated with activating the broadcast service in a given service area 10, while an "AND" logical construct of all associated service zones 14 is associated with deactivating such service in that service area 10.

Thus, assuming that a given broadcast service currently inactive within a given service area 10, the network 12 monitors for receipt of registration requests for that service in all service zones 14 in which the service area 10 is a member (Steps 130 and 132). If one or more such requests are received, the network 12 activates (or continues) the broadcast service for the service area 10 (Step 134). In an exemplary embodiment, this entails allocating (or retaining) transmission resources at the RBS 34 or other transmitter entity that provides for transmission of a broadcast channel signal carrying the broadcast service information stream within the service area 10. For example, in cdma2000-based network implementations, network 12 may use a Forward Broadcast Supplemental Channel (F-BSCH) for transmission of the broadcast service in each area 10.

Network 12 manages the registration flag transmitted for the broadcast service all service areas 10 according to the logic of FIG. 3 (Step 136). Thus, the network 12 monitors or otherwise checks for the expiration of the broadcast service in all service zones 14 associated with the given service area 10 (Step 138). If the service has expired for all such service zones 14, which may be indicated by a set of expiration indicators, the network 12 discontinues transmitting the broadcast service for the service area (Step 140). However, if the broadcast service has not expired for all service zones 14 with which the service area 10 is associated with (Step 138), the network 12 continues transmission of that service and continues operations as described above. Note that deactivation of the broadcast service may entail releasing allocated radio resources at each RBS 34 supporting that service within the service area 10.

Figure 5:
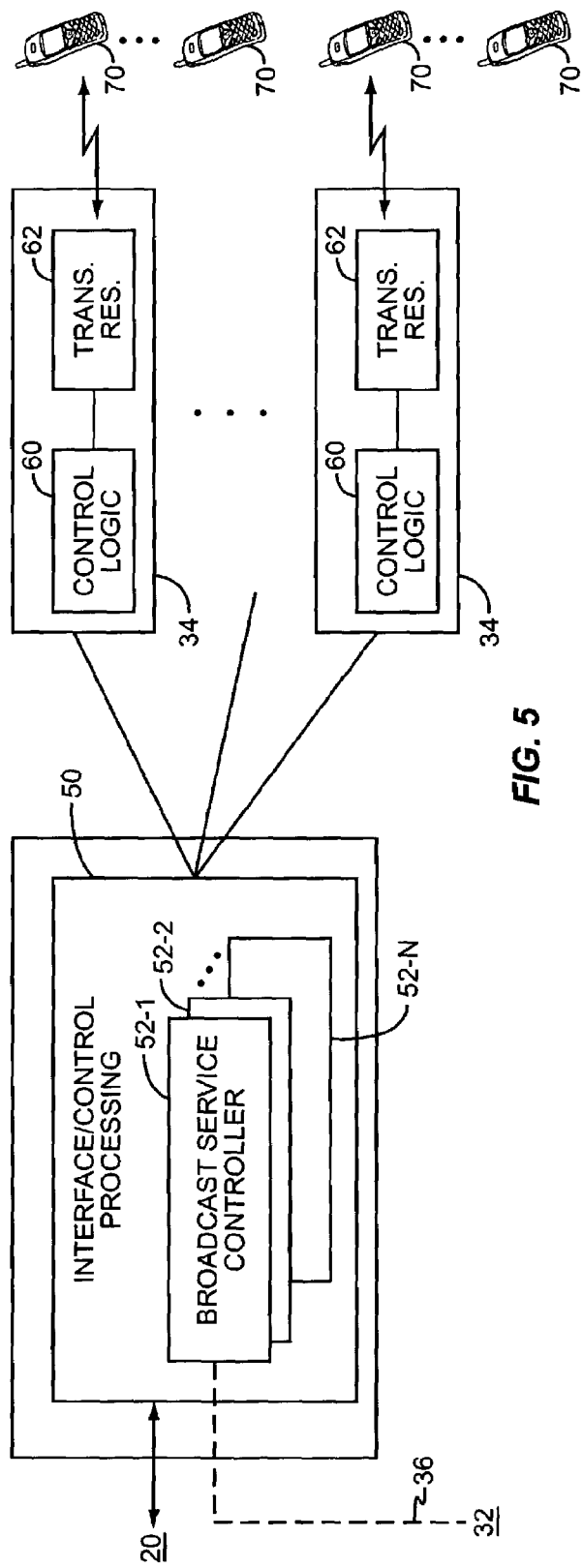
FIGS. 5 and 6 are diagrams of an exemplary base station controller and an exemplary radio base station for use in the network of FIG. 2.
Figure 6:
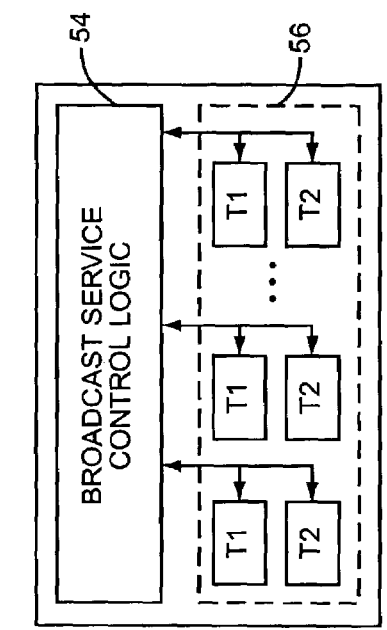

While the above flag-based broadcast service control logic may be implemented in a number of ways, FIGS. 5 and 6 illustrate exemplary implementations. In FIG. 5, each BSC 32 manages the transmission of registration flags from each RBS 34 operating under its control, based on receiving broadcast service registrations from mobile stations 70 operating in the service areas 10 associated with those RBSs 34.

In this capacity, each BSC 32 according to FIG. 5 functionally comprises interface and control processing resources 50, including one or more broadcast service controllers 52, i.e., 52-1, 52-2, . . . , 52-N, for managing N broadcast services in each of the service areas 10 managed by the BSC 32. Those skilled in the art will note that such an arrangement may be supported by hardware, software, or any desired combination thereof in the BSC 32, and will further appreciate that other functional arrangements may be used.

In any case, an exemplary BSC 32 controls at least one service area 10 and corresponding service zone 14 and, in that capacity, sets and clears the registration flag transmitted from the RBS(s) 34 providing radio coverage for that service area 10. An exemplary RBS 34 comprises control logic 60 for communicating with BSC 32, and to provide timing and radio control functions, and transceiver resources 62 for transmitting broadcast service signals and registration flag signals to mobile stations 70.

Assuming that in a given BSC 32, broadcast service controller 52-1 controls a given broadcast service within one or more service areas 10. Referring to FIG. 6, controller 52-1 maintains control logic 54 and associated timers 56. Preferably, the controller 52-1 maintains a T1/T2 pair of timers for each service zone 14 represented by the controlled service areas 10. With this exemplary arrangement, the control logic 54 manages timers 56 in accordance with the logic described in the context of FIGS. 3 and 4. Thus, the BSC 32 may use expiration of each T2 timer as the "service expiration indicator" for the corresponding service zone 14, such that it deactivates the broadcast service in a given service area 10 if all T2 timers have expired in all service zones 14 associated with that service area 10.

Note that one BSC 32 generally manages multiple service areas 10 and corresponding service zones 14. While such service zones 14 may be defined based on the characteristics of the network 12, such as by associating one or more neighboring service areas 10, network 12 may employ dynamic service zones 14. Thus, the network 12 may dynamically shape the service zones 14 where each broadcast/multicast session is transmitted based on the locations of mobile stations 70 that desire that particular broadcast service. A given service zone 14 might thus expand and contract on the basis of small overlapping zones of network cells.

In an exemplary approach to dynamic service zones 14, mobile stations 70 operating within one or more service areas 10 of the network provide feedback information that may be used to dynamically configure the service area/service zone associations used by network 12. For example, such feedback information might comprise each mobile station 70 reporting which service areas 10 can be used to provide the desired broadcast service signal to it. Note that a given mobile station 70 may use soft combining if it receives the broadcast service signal from network transmitters in multiple service areas 10.

Thus, in an exemplary embodiment, a mobile station 70 reports its "active set" to the network 12, which might entail reporting the set of RBSs 34 from which it receives signals above a given signal strength. In some embodiments, the network 12 might provide threshold information to the mobile station 70 for use in determining its active set. Regardless, the network 12 may use the reported active set information to dynamically configure the zone 14 in which the broadcast service is activated.

In an exemplary implementation, "neighbor list" information is transmitted for each service area 10. Such neighbor list information may be the same or similar to the neighbor list lists used in, for example, IS-95 systems, where the neighbor list transmitted for a given radio sector identifies a list of neighboring sector pilot signals. However, the neighbor list used in the context of the present invention might comprise, for example, the list of neighboring service areas corresponding to a default zone defined for each service area. The registration flag information transmitted in each service area 10 may be implemented as a registration flag array where each array element represents the registration flag for one of the service areas 10 in the neighbor list. For example, if there are N service areas 10 in the neighbor set for a given service area 10, the flag array transmitted in that service area 10 might include N flag bits. Each flag bit may be aged separately (timed separately) in the same way as single registration flag timing was described earlier herein.

When a mobile station 70 detects that a flag bit in a received registration flag array is set for one or more pilots in its active set, the mobile station 70 recognizes that it needs to register with network 12 to provide an indication of the mobile's active set. At the network 12, such registration may reset the flag timer(s) associated with each of the service areas 10 corresponding to the pilots identified in the reported active set, or the network may simply reset the flag timer(s) associated with the service area 10 in which the registration request was received.

In response to receiving a registration request within a given service area 10, the network 12 could activate the default service zone 14 controlled by that service area 10. However, the network 12 could activate the broadcast service only in the service areas 10 identified in the requesting mobile station's reported active set. Thus, the network 12 might use the active set information to activate a smaller dynamic zone 14 within the default zone boundary. Thus, one advantage of dynamically defined service zones 14 is that service is turned on only in service areas 10, e.g., cells, that belong to the active set of a given mobile station 70.

With or without dynamic zone configurations, the network 12 generally transmits registration flag information, such as single bit logical indicators or arrays of such indicators, for purposes of broadcast service control. Regardless of the particular format in which the registration flag information is transmitted by the network 12, the transmission of timed registration flag information by network 12 permits it to prompt mobile stations 70 to register for a broadcast service on a service area basis, and to detect when such services have expired on a service zone basis. Here, service expiration is defined as the absence of any requests for a given broadcast service from any controlling service areas 10 comprising a given service zone 14 within the defined timeout periods.

In other exemplary implementation details, it was noted earlier that the present invention offers reduced signaling by foregoing the need for periodic mobile station broadcast service registrations. Nevertheless, one can imagine select scenarios where network 12 might still receive an unnecessarily large number of registration requests for a broadcast service in a given area 10. For example, assume that a relatively large number of mobile stations 70, all desiring access to a given broadcast service, are located within a given service area 10 when the flag for that broadcast service is reset upon expiration of the first timeout period. All mobile stations 70 within that area 10 would, without provisions otherwise, transmit a registration request for the broadcast service responsive to recognizing the set condition of the flag. Such unnecessary registration signal may, however, be avoided.

Figure 7:
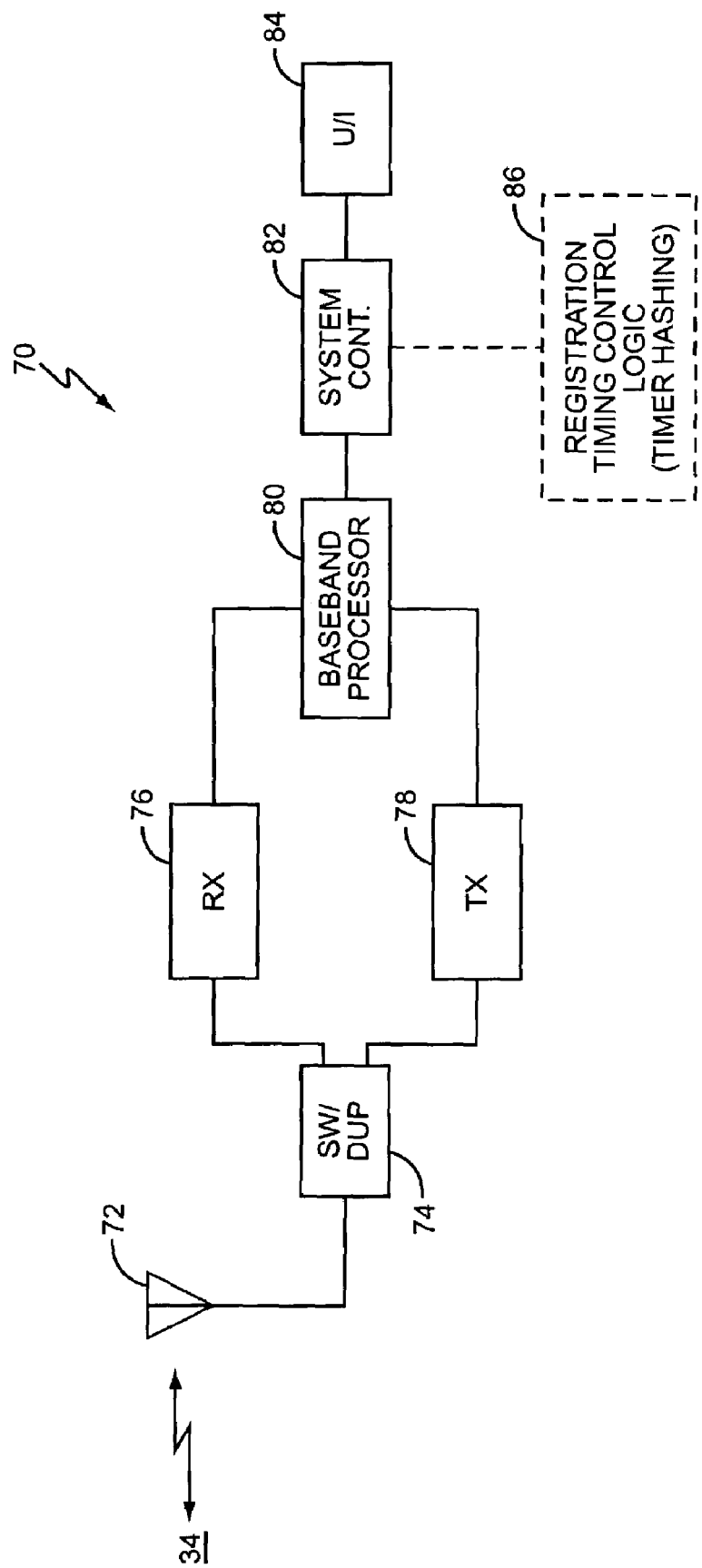
FIG. 7 is a diagram of an exemplary mobile station that includes registration flag processing capability for use in the network of FIG. 2.

FIG. 7 illustrates an exemplary configuration for mobile stations 70 that provides functional logic to reduce the aggregate number of registration requests received by network 12. The exemplary mobile station 70 comprises an antenna 72 for transmitting and receiving signals to and from RBSs 34, a switch/duplexer 74 for coupling a RF receiver 76 and a RF transmitter 78 to antenna 72, a baseband processor 80 for providing signal processing (channel/error coding, etc.), a system controller 82 for providing control of a user interface (U/I) 84, and providing registration control logic 86.

In an exemplary embodiment, registration control logic 86 operates according to a "hashing" function that provides a registration response delay that sets the amount of time that the mobile station 70 waits before sending a broadcast service registration request to network 12 in response to receiving a set registration flag for that service from the network 12. Thus, the control logic 86 (1) recognizes that a set registration flag has been received; (2) waits for the configured response delay; (3) checks whether the flag is still set; and, if so, (4) transmits a registration request for the broadcast service to the network 12.

Because the network 12 again clears the flag responsive to the first incoming registration request, the first responding mobile station 70 in a given service area 10 generally prevents the other mobile stations 70 in that area from sending additional registration requests for the same broadcast service. Thus, usually just one but no more than a few registration requests normally will be transmitted from even large groups of mobile stations 70 when the registration flag transitions from the cleared state to the set state within a given service area 10.

Adopting differing registration response delays among the mobile stations 70 thus avoids the network 12 being flooded with registration requests by large groups of mobile stations 70 that are all subscribed to the same broadcast service within the same service area 10. Of course, it should be noted that the registration response delay does not have to be unique to each mobile station 70, but should have enough variety that no more than a few mobile stations 70 within any given group have the same or nearly the same registration response delay.

Configuring the various flag timers and response delays is subject to much variation. However, in an exemplary configuration, timers T1 and T2 are chosen such that the combination of the first and second expiration periods provides an "aging" mechanism such that a mobile station 70 moving among service areas 10 in network 12 leaves behind a service activation "tail" of T1+T2 seconds. Also, if the above response delay mechanism is used in mobile stations 70, the value of T2 should be greater than the maximum response delay. Thus, if the response delay is Th, then Th(max)<T2. Exemplary values for T1, T2, and Th(max) are, respectively, 90 seconds, 90 seconds, and 60 seconds.

Further, since timer T2 serves as a broadcast service "keep-alive" timer, the T2 timers corresponding to a set of service areas 10 comprising a service zone 14 should be set such that each one is longer than the periodic registration interval of mobile stations that employ periodic broadcast service registration timers. Thus, T2>Tp(max) for all service areas 10, where Tp(max) is the expected maximum periodic mobile station registration interval. Configuring T2 in this manner ensures that the network 12 does not prematurely deactivate a broadcast service in a given service zone 14 where the only mobile station(s) subscribed to the service within the zone 14 use periodic registrations rather than flag-driven registrations.

Even with the above hashing operations, or with similar registration response staggering mechanisms, it should be noted that mobile stations 70 might be configured to perform an immediate broadcast service registration if they undergo an idle handoff from a service area 10 where the registration flag is cleared to a service area 10 where the flag is set. That is, the mobile station's registration response delay mechanism can be skipped during idle handoff operations.

In general the present invention uses registration flags to manage broadcast service transmissions within defined service zones 14 comprised of one or more service areas 10, and the above discussion provides exemplary implementation details. However, the foregoing details should not be considered as limiting the present invention. Rather, the present invention is limited only by the scope of the following claims and the reasonable equivalents thereof.

What is claimed is:

1. A method of controlling a broadcast service in a plurality of service areas of a wireless communication network, wherein a service area comprises one or more cells, the method comprising:
    determining two or more service zones, each comprising one or more of the service areas, wherein at least one of the service areas is a member of two or more of the service zones, and wherein service areas are distinct from service zones for purposes of controlling broadcast service registrations; and
    transmitting registration flag information in each service area to prompt for broadcast service registrations on a service area basis and detecting broadcast service expirations on a service zone basis.

2. The method of claim 1, further comprising activating the broadcast service in all service zones controlled by one of the service areas if a registration request for the broadcast service is received in that service area.

3. The method of claim 2, further comprising continuing the broadcast service in a given service zone, if the broadcast service is already active in that service zone and a registration request for the broadcast service is received in a controlling service area associated with that service zone.

4. The method of claim 2, wherein activating the broadcast service in all service zones controlled by one of the service areas if a registration request for the broadcast service is received in that service area comprises transmitting the broadcast service in all service areas included in the service zones controlled by the service area in which the registration request was received.

5. The method of claim 2, wherein activating the broadcast service in all service zones controlled by one of the service areas comprises initiating transmission of the broadcast service on a forward broadcast supplemental channel (F-BSCH) signal in each service area of all service zones controlled by the service area in which the registration request was received.

6. The method of claim 2, further comprising deactivating the broadcast service in one of the service areas if the broadcast service expires in all service zones with which that service area is associated.

7. The method of claim 6, wherein deactivating the broadcast service in one of the service areas if the broadcast service expires in all service zones with which that service area is associated comprises ending transmission of the broadcast service in that service area.

8. The method of claim 1, wherein determining service zones comprises defining fixed associations between the service areas and the service zones based on one or more network parameters.

9. The method of claim 1, wherein determining service zones comprises defining dynamic associations between the service areas and the service zones based on feedback information from mobile stations that desire access to the broadcast service while operating within one or more of the service areas of the network.

10. The method of claim 9, wherein the feedback information comprises an active set report from each mobile station that identifies the service areas from which the broadcast service may be received by the mobile station.

11. The method of claim 10, wherein the network dynamically defines a service zone based on the active set report from the mobile station.

12. The method of claim 10, wherein each service area transmits a registration flag array as the registration flag information that identifies a neighbor list of service areas, and further comprising forming one or more service zones based on the active set and the neighbor list.

13. The method of claim 10, further comprising:
    transmitting a neighbor list in each service area that identifies a default service zone for the service area;
    receiving an active set report from a mobile station in the service area that desires access to the broadcast service; and
    dynamically configuring the service zone for activation of the broadcast service based on the active set report.

14. The method of claim 1, wherein transmitting registration flag information in each service area comprises transmitting at least one registration flag indicator on an overhead channel broadcast by the network within each service area.

15. The method of claim 14, wherein transmitting at least one registration flag indicator on an overhead channel broadcast by the network within each service area comprises transmitting such information on either a Forward Paging Channel (F-PCH) or a Forward Broadcast Channel (F-BCCH).

16. The method of claim 1, wherein transmitting registration flag information in each service area to prompt for broadcast service registrations on a service area basis and detect broadcast service expirations on a service zone basis comprises:
    transmitting at least one registration flag indicator in each service area that is set if registration for the broadcast service currently is required and is cleared if such registration currently is not required;
    clearing the at least one registration flag indicator and starting a first timeout period if a registration request is received;
    resetting the at least one registration flag indicator and starting a second timeout period if the first timeout period expires; and
    deeming the broadcast service to have expired for a service zone controlled by the service area if no registrations are received before expiration of the second timeout period.

17. The method of claim 16, further comprising setting a duration of the second timeout period longer than a duration of a registration period used by one or more mobile stations for periodic broadcast service registrations.

18. The method of claim 16, further comprising setting durations of the first and second timeout periods for each service area based on a size of the service zone controlled by the service area.

19. The method of claim 1, wherein determining service zones comprises:
    determining each service zone as a set of one or more member service areas; and
    designating at least one member service area as a controlling service area and any remaining member service areas as associated service areas.

20. The method of claim 19, further comprising defining one or more service zones to be overlapping based on defining one or more service areas to be member service areas of two or more service zones.

21. The method of claim 19, further comprising activating the broadcast service for all member service areas of a service zone when a registration request is received in the controlling service area of that zone.

22. The method of claim 21, further comprising deactivating the broadcast service in a service area only if the broadcast service has expired in all service zones in which the service area is a member.

23. The method of claim 1, wherein determining service zones comprises defining fixed service zones based on fixed associations between service areas and service zones.

24. The method of claim 1, wherein determining service zones comprises defining dynamic service zones based on dynamic associations between service areas and service zones.

25. A base station controller (BSC) for controlling transmission of a broadcast service in a plurality of service areas in a wireless communication network, wherein a service area comprises one or more cells, and wherein said BSC is configured to:
   determine two or more service zones, each comprising one or more of the service areas, wherein at least one of the service areas is a member of two or more of the service zones, and wherein service areas are distinct from service zones for purposes of controlling broadcast service registrations; and
   transmit registration flag information in each service area to prompt for broadcast service registrations on a service area basis and to detect broadcast service expirations on a service zone basis.

26. The BSC of claim 25, wherein the BSC activates the broadcast service in all service zones controlled by a service area if a registration request for the broadcast service is received in the service area.

27. The BSC of claim 26, wherein the BSC activates the broadcast service in a service area by initiating transmission of the broadcast service on a forward broadcast supplemental channel (F-BSCH) signal transmitted in the service area.

28. The BSC of claim 26, wherein the BSC continues the broadcast service in a service zone if the broadcast service is already active in the service zone and a registration request for the broadcast service is received in a controlling service area of the service zone.

29. The BSC of claim 26, wherein the BSC activates the broadcast service in a service area by initiating transmission of the broadcast service in the serviced area.

30. The BSC of claim 26, wherein the BSC deactivates the broadcast service in a service area if the broadcast service expires in all service zones with which that service area is associated.

31. The BSC of claim 30, wherein the BSC activates and deactivates the broadcast service in each service area based on controlling one or more radio base stations (RBSs) that provide radio coverage for the service area.

32. The BSC of claim 31, wherein the BSC transmits registration flag information based on transmitting registration flag information from the one or more RBSs that provide radio coverage for the service area.

33. The BSC of claim 30, wherein the BSC deactivates the broadcast service in a service area by ending transmission of the broadcast service in the service area.

34. The BSC of claim 25, wherein the BSC determines service zones based on defining each service zone to include one or more member service areas, with at least one member service area defined as a controlling service area for the service zone.

35. The BSC of claim 34, wherein the BSC activates or continues transmission of the broadcast service in all member service areas of a service zone if a registration request is received in a controlling service area of the service zone.

36. The BSC of claim 25, wherein the BSC comprises at least one broadcast service controller configured to manage transmitting registration flag information and activating and deactivating the broadcast service.

37. The BSC of claim 36, wherein the BSC further comprises interface and control resources that include the at least one broadcast service controller, and further include:
   a network interface to interface the BSC to one or more network entities carrying call traffic to and from an external network;
   one or more radio base station interfaces that interface the BSC to one or more radio base stations that provide radio coverage for the plurality of service areas; and
   wherein the BSC controls transmission of the broadcast service and the registration flag information via the one or more radio base station interfaces.

38. The BSC of claim 36, wherein the broadcast service controller comprises:
   timing circuits for timing expiration of the broadcast service in each service zone; and
   control logic for managing the timing circuits and for controlling activation and deactivation of the broadcast service in each service area.

39. The BSC of claim 25, wherein the BSC transmits the registration flag information in each service area by sending a Broadcast Service Parameters Message on an overhead channel signal transmitted from one or more radio base stations (RBSs) that provide radio coverage in each service area.

40. The BSC of claim 25, wherein the BSC determines service zones based on fixed associations between the service areas and the service zones.

41. The BSC of claim 25, wherein the BSC determines service zones based on dynamic associations between the service areas and the service zones determined at least in part from feedback information from mobile stations that desire access to the broadcast service while operating within one or more of the plurality of service areas.

42. The BSC of claim 41, wherein the feedback information comprises an active set report from each mobile station that identifies the service areas from which the broadcast service may be received by the mobile station.

43. The BSC of claim 42, wherein the BSC controls transmission of a registration flag array in each service area by setting the registration flag information to identify a neighbor list of service areas for the service area.

44. The BSC of claim 43, wherein the BSC dynamically forms one or more service zones based on comparing the active set with the neighbor list.

45. The BSC of claim 25, wherein the BSC transmits registration flag information in each service area by:
   transmitting at least one registration flag indicator in the service area that is set if registration for the broadcast service currently is required and is cleared if such registration currently is not required;
   clearing the at least one registration flag indicator and starting a first timeout period if a registration request is received;
   resetting the at least one registration flag indicator and starting a second timeout period if the first timeout period expires; and deeming the broadcast service to have expired for the service zone controlled by the service area if no registrations are received before expiration of the second timeout period.

46. The BSC of claim 45, wherein the BSC sets a duration of the second timeout period longer than a duration of a periodic registration period used by one or more mobile stations for periodic broadcast service registrations.

47. The BSC of claim 45, wherein the BSC sets durations of the first and second timeout periods for the service area based on a size of the service zone controlled by the service area.

48. A mobile station for use in a wireless communication network comprising:
   a receiver to receive data transmitted from the network, said data including registration flag information that indicates whether registration currently is required for a corresponding broadcast service, wherein the registration flag information comprises a registration flag that is set to indicate that registration currently is required and cleared to indicate that such registration currently is not required;
   registration control logic to control generation of broadcast service registration requests responsive to the registration flag information, said registration control logic configured to:
      determine whether the registration flag for the broadcast service is set or clear;
      wait for a defined delay responsive to determining the registration flag is set; and
      transmit a registration request for the broadcast service if the registration flag is still set after waiting the defined delay; and
   a transmitter to transmit the registration requests to the network.

49. The mobile station of claim 48, wherein the network transmits registration flag information for two or more broadcast services, and wherein the registration control logic controls transmission of registration requests for each broadcast service responsive to the registration flag information corresponding to that service.

50. The mobile station of claim 48, wherein the defined delay is determined from a mobile station identifier assigned to the mobile station.

51. The mobile station of claim 48, wherein the defined delay is determined as a randomized function.

52. The mobile station of claim 48, wherein the mobile station is configured to forego the defined delay and register immediately if the mobile station undergoes an idle handoff into a service area where the registration flag is set.

* * * * *